Sept. 27, 1960   J. K. GAUNT ET AL   2,954,123
HARVESTING MACHINE OR COMBINE
Filed Sept. 12, 1957   4 Sheets-Sheet 1

INVENTORS.
JAMES KENNETH GAUNT
AUGUST KOCH TEMPLETON
BY
Carlson, Pitzner, Hubbard & Wolfe
ATTORNEYS.

Sept. 27, 1960     J. K. GAUNT ET AL     2,954,123
HARVESTING MACHINE OR COMBINE
Filed Sept. 12, 1957                     4 Sheets-Sheet 3

INVENTORS.
JAMES KENNETH GAUNT
AUGUST KOCH TEMPLETON
BY
Carlson, Pitzner, Hubbard & Wolfe
ATTORNEYS.

INVENTORS.
JAMES KENNETH GAUNT
AUGUST KOCH TEMPLETON

United States Patent Office 2,954,123
Patented Sept. 27, 1960

2,954,123

HARVESTING MACHINE OR COMBINE

James Kenneth Gaunt and August Koch Templeton, Melbourne, Victoria, Australia, assignors to Massey-Ferguson (Australia) Limited Filed Sept. 12, 1957, Ser. No. 683,635

5 Claims. (Cl. 209—21)

The present invention relates to combined harvesting machines and more particularly to an improved winnowing fan arrangement for use with such machines.

A grain harvesting machine, or combine, conventionally employs an upwardly directed blast of air to clean the harvested grain as the grain is passed over a porous sieve and screen assembly. The effect of the air stream is to lift the chaff and other foreign material from the grain and float it away.

The air current required for this operation is generated by a fan assembly which conventionally includes fans having impeller vanes extending the width of the screen and sieve assembly and which rotate about a horizontal axis within a cylindrical casing. The fan assembly discharges an air stream through a duct opening tangentially from the casing, and air is drawn into the fan through air intake openings in each end of the casing.

Since the air stream must be directed upwardly, the fan assembly is normally mounted at the bottom of the combine and relatively close to the ground. This places the fan in a region where the air is laden with flying chaff, dust, dirt and loose straw when the combine is in operation. As a result, the problem of how to prevent the fan assembly from sucking in large quantities of foreign material and discharging it into the grain has existed from the days of the earliest combines.

Many expedients have been adopted to keep the air intake of a combine winnowing fan clean. Screens and filters have been placed over the air intake passages, but these tend to rapidly become choked with loose straw and chaff. Baffles have also been provided to define air inlet openings facing rearwardly or upwardly, and these openings have then been screened. While reducing the intake of foreign materials, such baffled openings have also been found to eventually become choked.

It has also been proposed to extend air intake ducts upwardly from the fan and out of the region of airborne material. But heretofore this has proven impractical, particularly with the larger combines having wide screen and sieve assemblies and therefore long fans. This is because fan assemblies normally include two or more sets of adjacent fans having central air intake openings in the surrounding cylindrical casing. An air intake duct cannot be extended upwardly from these central intake openings due to the closely overlying combine structure.

It is therefore the general aim of the invention to provide a novel winnowing fan arrangement for a combine which is effective to generate and maintain a clean, uniform air flow across a screen and sieve assembly of any desired width.

With more particularity, it is an object to provide a novel fan arrangement having air intake openings located substantially above the fan, and thus out of the region of flying chaff and foreign material, which openings are effective to adequately supply air to any number of axially alined and spaced fans of efficient proportion making up the fan assembly.

It is another object to provide a fan assembly having a novel arrangement for feeding intake air to the central portion of the assembly efficiently and at high volume but which is free of the disadvantages associated with conventional central intake arrangements.

It is also an object to provide a fan assembly of the above type in which the rotary blade assemblies remain readily accessible and therefore easy to service and maintain.

It is a further object to provide a novel fan assembly in which the rotary driving means and the supporting bearings for the rotatable blades are effectively shielded from the dust laden air.

Other objects and advantages of the invention will become apparent upon reading the attached detailed description and upon reference to the drawings in which.

While the invention will be described in connection with a preferred embodiment, it will be understood that we do not intend to limit the invention to that embodiment. On the contrary we intend to cover all alternatives, modifications and equivalents as may be included within the spirit and scope of the invention as defined by the appended claims.

Figure 1:
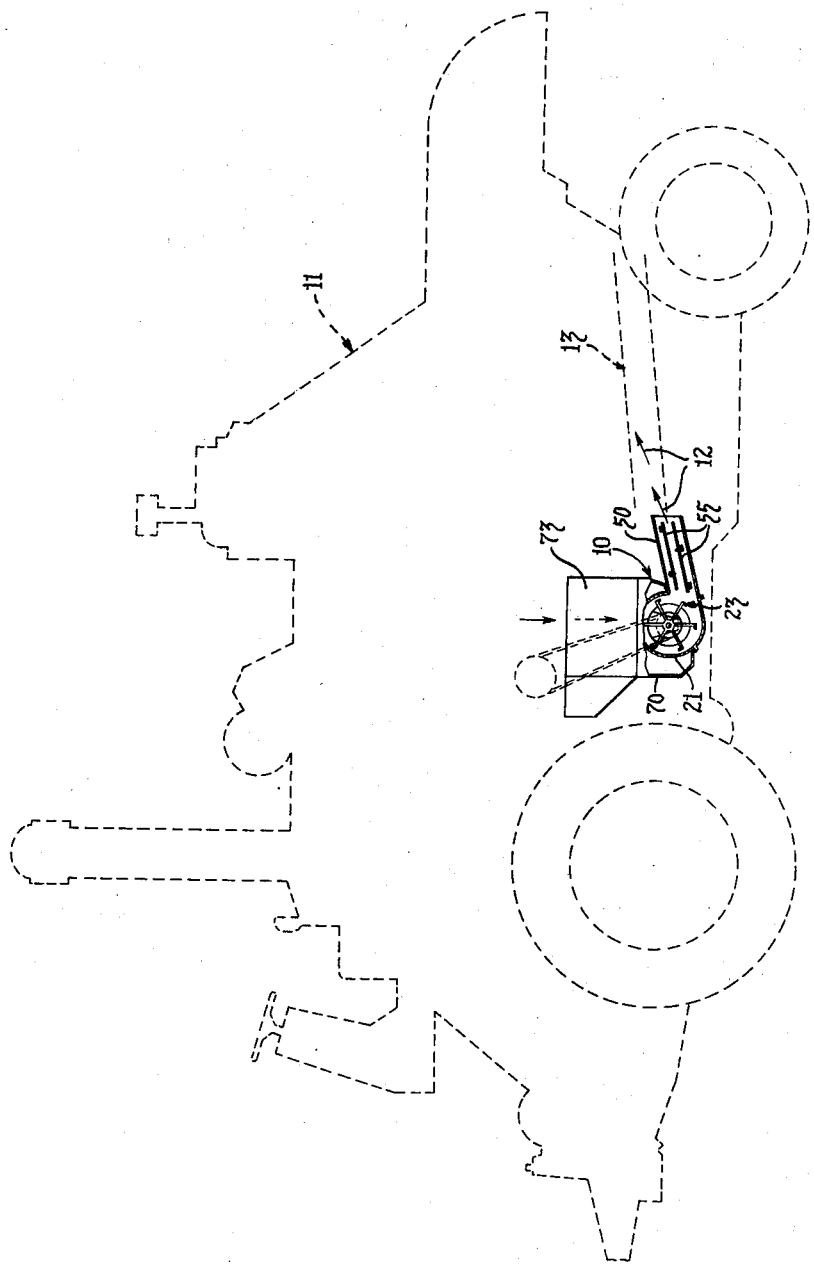
Figure 1 is a phantom elevation view of a self-powered combine in which is utilized a fan assembly embodying the present invention shown in full lines.

Turning first to Fig. 1, there is shown a winnowing fan assembly 10, constructed in accordance with the present invention, installed in a harvesting machine or combine 11 so as to direct a blast of air, indicated by the arrows 12, upwardly through the cleaning sieve and screen assembly 13 of the combine.

Figure 2:
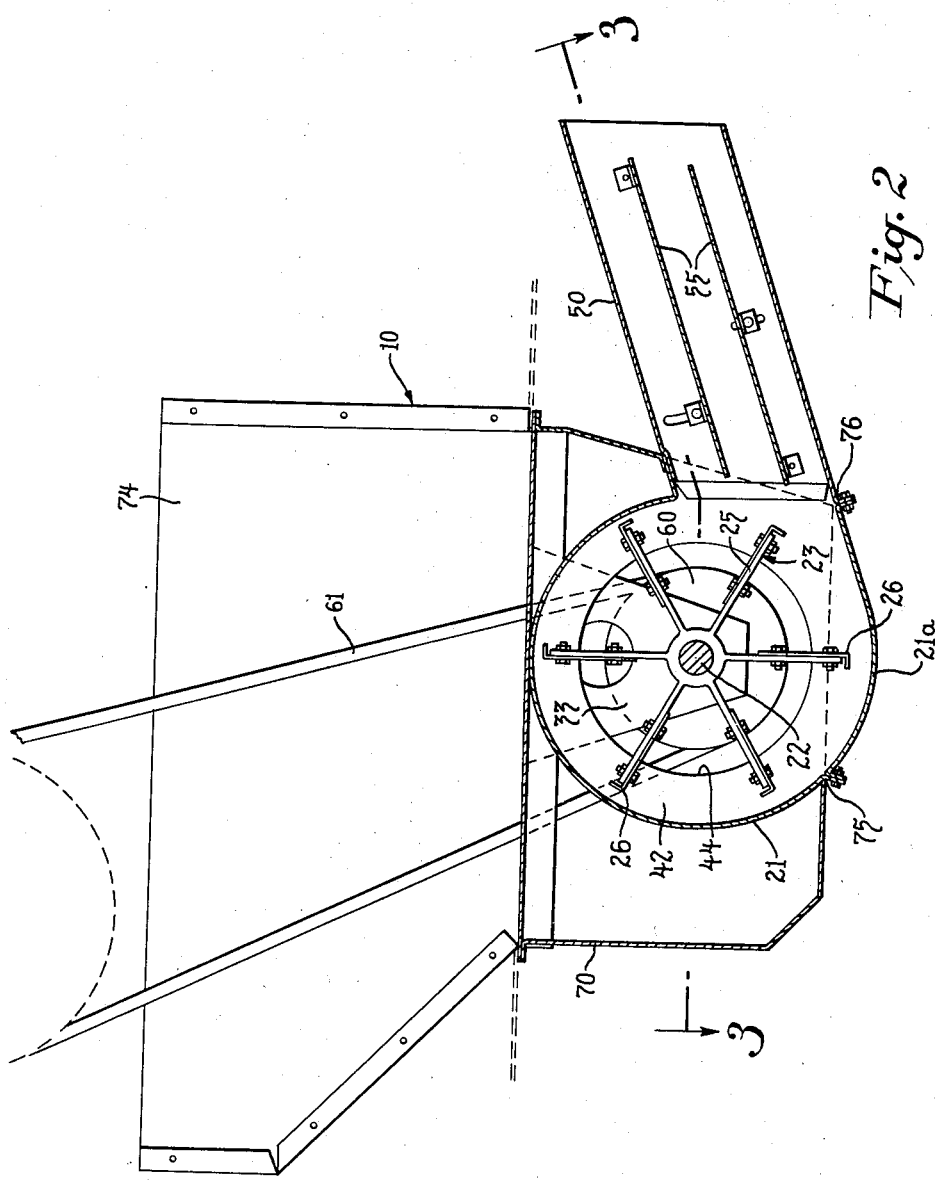
Fig. 2 is an enlarged sectional view of the fan assembly shown in Fig. 1.
Figure 3:
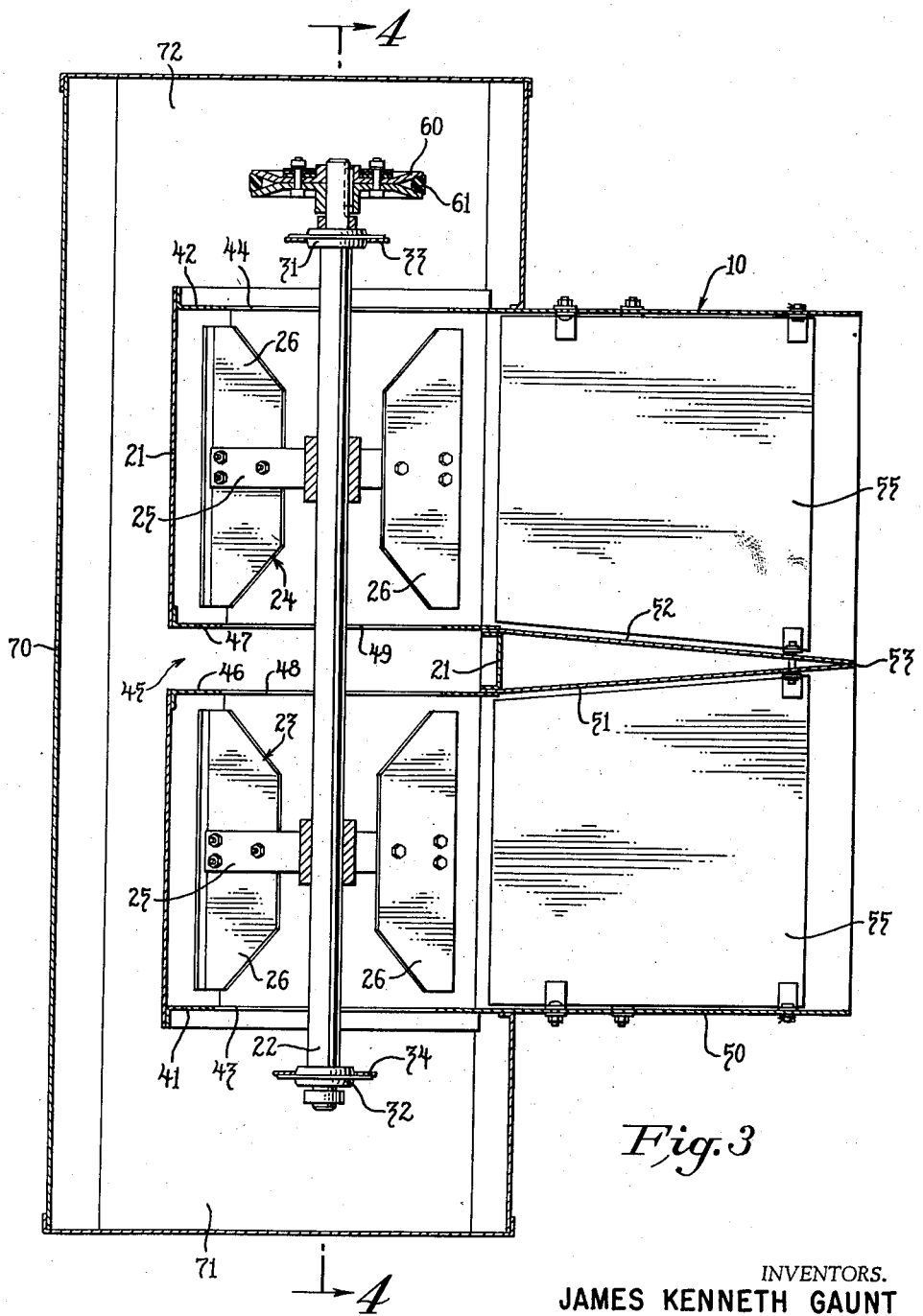
Fig. 3 is a sectional plan view taken along the line 3—3 of Fig. 2.
Figure 4:
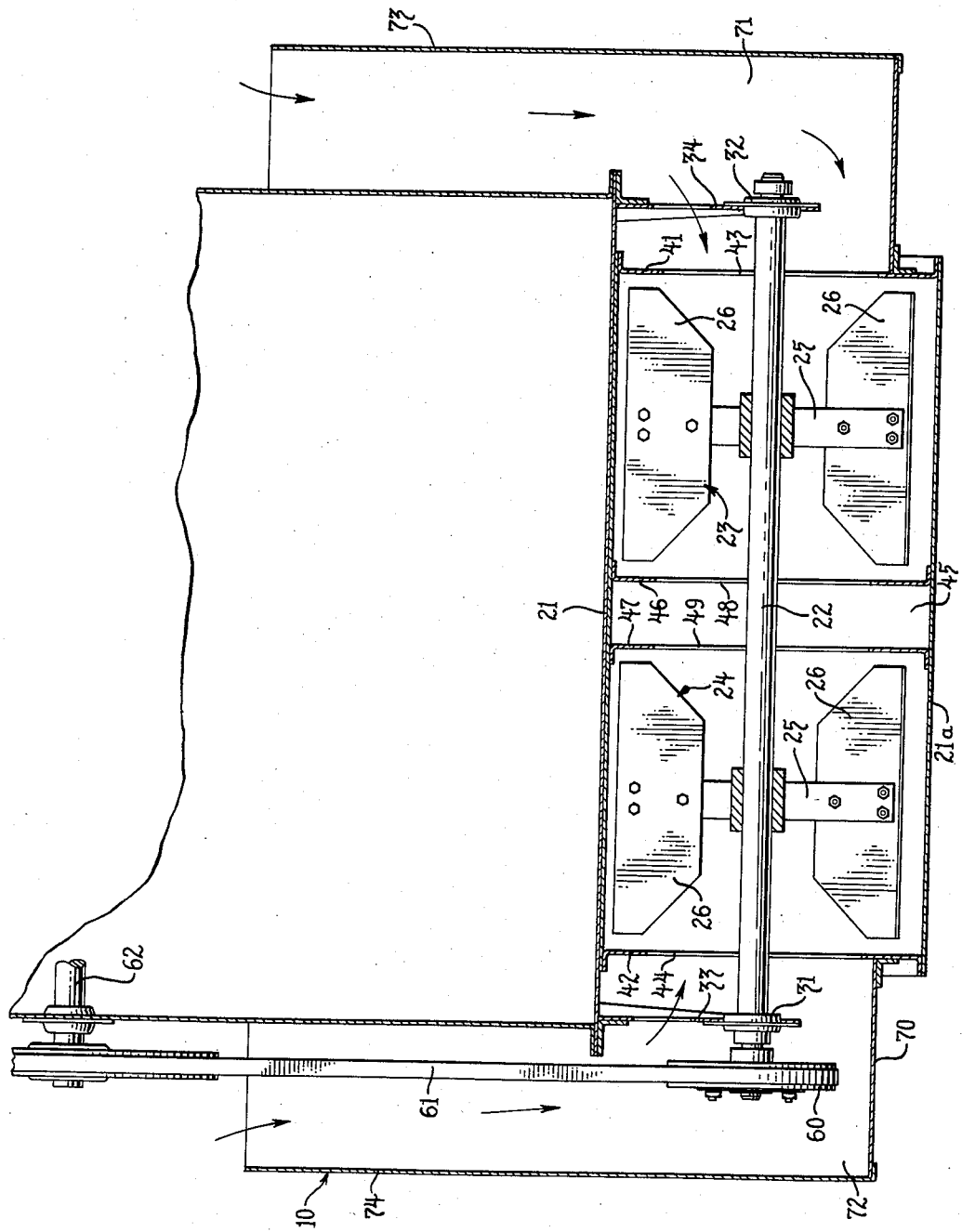
Fig. 4 is a transverse sectional view taken along the line 4—4 of Fig. 3.

The fan assembly 10, shown more clearly in Figs. 2 to 4, comprises a two-part cylindrical casing 21 in which is positioned a journaled fan shaft 22 carrying a plurality of fans. In the present embodiment, two fans 23, 24 are mounted for rotation on the fan shaft 22. Each of the fans 23, 24 comprises a spider 25 having arms to which are secured a plurality of radially disposed impeller vanes or blades 26.

The fan shaft 22 is journaled at its opposite ends in bearings 31, 32 carried by depending brackets 33, 34, respectively. The bearings 31, 32 support the fan shaft 22 along approximately the axis of the cylindrical casing 21 so that rotation of fan shaft causes the fan blades 26 of the fans 23, 24 to sweep about the inner periphery of the cylindrical casing in the manner conventional with rotary fans of this type.

Providing air intake passages for the fans, annular end plates 41, 42 are mounted at opposite ends of the casing 21 and are formed with central air intake openings 43, 44 respectively. In addition, the casing 21 is provided with an intermediate air intake passage comprising an arcuate opening 45 (see Fig. 3) located intermediate the fans 23, 24. Preferably, annular center plates 46, 47 are positioned on either side of the peripheral intermediate opening 45 in order to increase the efficiency of the fans. The center plates 46, 47 are similar to the end plates 41, 42 and are provided with central openings 48, 49, respectively. In this way, the outer edges of the fan blades 26 comprising the fan 23 rotate in an inwardly opening annular space defined by the cylindrical casing 21, the annular end plate 41 and the annular center plate 46. Likewise, the edges of the blades comprising the fan 24 rotate in a similar annular space defined between the end plate 42 and the center plate 47.

For the purpose of discharging air from the fan assembly 10 upwardly through the sieve and screen assembly 13, a tangential air discharge duct 50 is provided extending across the entire width of the cylindrical casing 21. In the illustrated embodiment, the duct 50 is generally rectangular in section and is subdivided by a pair of partitions 51, 52 (Fig. 3) so that, in effect, an individual discharge duct is provided for each of the fans 23, 24. The partitions 51, 52 come together at their outer ends 53 so that the airstreams from the fans 23, 24 will merge into a uniform current across the cleaning area of the combine.

The discharge duct 50 is also preferably provided with adjustable deflectors 55 (Fig. 2) pivotally mounted within the duct in a generally horizontal position so as to horizontally stratify air flowing therethrough. It can be seen that angular adjustment of the deflectors 55 permits air currents to be discharged at different vertical angles from the duct 50 so that air may be selectively directed over the sieve and screen area.

In order to drive the fan shaft 22 and thus the fans 23, 24, a pulley 60 is secured at one end of the fan shaft and connected by means of a flexible driving belt 61 to a drive shaft 62 (see Fig. 4). The drive shaft 62 may be any convenient driven shaft of the power train provided in the combine 11.

In accordance with the present invention, a trunk 70 is provided for substantially surrounding the cylindrical casing 21 and enclosing the air intake openings 43—45, and which has a cross section significantly greater than the casing and a length to extend outboard of the overlying combine structure with the opposite ends terminating in vertical open-top stacks having their upper ends opening well above the level of the fans. In this way, the stacks extend above the layer of air laden with flying chaff, dust, dirt and loose straw when the combine is in operation and the fans are therefore able to draw clean air down the stacks, into the trunk, and through the air intake openings.

In the illustrated embodiment, the trunk 70 is generally rectangular and has portions 71, 72 (see Figs. 3 and 4) extending axially outward from either side of the combine 11. Opening into each of the extending portions 71, 72 are stack structures 73, 74, respectively. Each of the stacks 73, 74 extends upwardly along the side of the normal combine superstructure and it can be seen in the drawings that their open tops are located substantially above the air intake openings 43, 44, 45 of the fans. Since the stacks 73, 74 are outboard of the higher combine structure, it can be seen that they can be extended upwardly to the height of the combine or even higher if conditions under which the combine is to operate would make this necessary to insure a clean air supply for the fan assembly.

The trunk 70 is sufficiently commodious to convey an adequate supply of air laterally along the outside of the cylindrical casing 21 to the intermediate air intake opening 45 with little or no pressure drop. It will be appreciated that with this construction any number of fans similar to fans 23, 24 can be axially alined within an elongated cylindrical casing and provided with intermediate air intake openings which would draw clean air from the trunk. The advantages of providing several shorter fans with intermediate openings in the surrounding casing rather than one long fan are twofold. First, it is commonly recognized that rotary fans of the type employed in combines, have an optimum diameter-length ratio for greatest efficiency. Thus, several shorter fans generate a stronger and more uniform air blast than a single long fan. Second, atmospheric wind striking the combine tends to affect the intake of air at the outer exposed ends of the fans and if the fan relies solely on such openings its operation becomes erratic as the wind conditions vary.

As an additional feature of the invention, it will be noted that the trunk 70 encloses the bearings 31, 32 and the pulley 60, with the pulley being alined with one of the stacks 73, 74. In this way, the belt 61 may extend upwardly through the alined stack to the drive shaft 62 so that the trunk and stack structure completely shields the bearings and driving means for the fan assembly 10 from the dust and dirt laden air normally surrounding such units.

It is another feature of the invention that the fans 23, 24 remain readily accessible for servicing despite the surrounding trunk and sleeve structure. This is accomplished by permitting the trunk 70 to enclose all but a bottom arcuate segment of the casing 21 and, in the preferred embodiment, by making that entire arcuate segment removable. Thus, in the present instance, the trunk 70 merges with the cylindrical casing 21 along the parallel lines 75, 76 (see Fig. 2) and that portion of the cylindrical casing 21 between the lines 75, 76 is formed as a removable panel 21a. It will therefore be appreciated that removal of the panel 21a will permit the fans 23, 24 and their associated structure to be easily serviced and maintained.

We claim as our invention:

1. For use with a harvesting machine which utilizes an upwardly directed air stream for winnowing, a fan assembly for generating said air stream comprising, in combination, a cylindrical casing having an open bottom portion and a tangentially arranged air discharge duct, a journaled fan shaft extending through said casing, a plurality of axially spaced fans mounted on said shaft, said casing having air intake openings between adjacent fans of said plurality and at opposite ends of the casing, a trunk enclosing said air intake openings and surrounding all but said open bottom of said casing, said trunk being adapted to extend laterally from the side of said harvesting machine, an open-top stack opening into said extending trunk portion and having its open top at the side of said machine above the level of said fans so as to provide access to clean air which may be drawn by the fans through said air intake openings, and an arcuate closure plate removably secured over said open bottom so as to complete the cylindrical casing while providing access to said fans.

2. For use with a harvesting machine which utilizes an upwardly directed air stream for winnowing, a fan assembly for generating said air stream comprising, in combination, a cylindrical casing having a tangentially arranged air discharge duct, a fan shaft extending through said casing, said shaft being journaled in bearings supported adjacent the opposite ends of said casing, a plurality of axially spaced fans mounted on said shaft, said casing having air intake openings between adjacent fans of said plurality and at opposite ends of the casing, a trunk enclosing said air intake openings and said bearings and substantially surrounding said casing, said trunk being adapted to extend laterally from the side of said harvesting machine, an open-top stack opening into said extending trunk portion and having its open top at the side of said machine above the level of said fans so as to provide access to clean air which may be drawn by the fans through said air intake openings, and means for driving said fans extending down through said stack into rotatable engagement with said shaft.

3. In a harvesting machine having a cleaning sieve, a fan assembly for providing an air stream through said sieve comprising, in combination, a cylindrical casing supported at the bottom of said machine and having a radially extending and upwardly inclined air discharge duct opening beneath said sieve, said casing having opposite end openings and an intermediate opening defining air intake passages, a journaled shaft extending through said end openings and said casing, a pair of fans fixed to said shaft and axially spaced within said casing on either side of said intermediate opening, a trunk enclosing said air intake passages and substantially surrounding said casing, said trunk being secured to said machine and extending laterally from the side of the machine, and a stack mounted vertically along the side of said machine and opening into the extended portion of said trunk, said stack having an upper opening located substantially above said fans so as to permit said fans to draw clean air down said stack and through said passages when the machine is in operation.

4. In a harvesting machine having a cleaning sieve, a fan assembly for providing an air stream through said sieve comprising, in combination, a cylindrical casing supported at the bottom of said machine and having a tangentially arranged and upwardly inclined air discharge duct opening beneath said sieve, said casing having opposite end openings and an intermediate opening defining air intake passages, a shaft extending through said end openings and said casing, said shaft being journaled in brackets fixed to said machine, a pair of fans fixed to said shaft and axially spaced within said casing on either side of said intermediate opening, a trunk enclosing said air intake passages and said brackets and substantially surrounding said casing, said trunk being secured to said machine and extending laterally from the side of the machine, a stack mounted vertically around the side of said machine and opening into the extended portion of said trunk, said stack having an upper opening located substantially above said fans so as to permit said fans to draw clean air down said stack and through said passages when the machine is in operation, and means for driving said fans extending down through said stack into rotatable engagement with said shaft.

5. In a harvesting machine having a cleaning sieve, a fan assembly for providing an air stream through said sieve comprising, in combination, a cylindrical casing supported at the bottom of said machine and having a tangentially arranged and upwardly inclined air discharge duct opening beneath said sieve, said casing having opposite end openings and an intermediate opening defining air intake passages, a shaft extending through said end openings and said casing, a pair of fans fixed to said shaft and axially spaced within the casing on either side of said intermediate opening, a trunk enclosing said air intake passages and surrounding all but a bottom arcuate segment of said casing, said trunk being secured to said machine and extending laterally from the side of the machine, and a stack mounted vertically around the side of said machine and opening into the extended portion of said trunk, said stack having an upper opening located substantially above said fans so as to permit said fans to draw clean air down said stack and through said passages when the machine is in operation, said bottom segment of said casing being removable so as to provide access to said fans.

References Cited in the file of this patent
UNITED STATES PATENTS

| | | |
|---|---|---|
| Re. 283 | Canby | Nov. 14, 1854 |
| 236,340 | Krake | Jan. 4, 1881 |
| 2,500,803 | Cockrell | Mar. 14, 1950 |
| 2,682,951 | Hamburg | July 6, 1954 |
| 2,849,118 | Ashton | Aug. 26, 1958 |